(12) United States Patent
Edwards

(10) Patent No.: US 9,327,567 B2
(45) Date of Patent: May 3, 2016

(54) TRAILER HITCH RECEIVER LOCKING APPARATUS

(71) Applicant: Gary D. Edwards, Richview, IL (US)

(72) Inventor: Gary D. Edwards, Richview, IL (US)

( * ) Notice: Subject to any disclaimer, the term of this patent is extended or adjusted under 35 U.S.C. 154(b) by 0 days.

(21) Appl. No.: 14/253,347

(22) Filed: Apr. 15, 2014

(65) Prior Publication Data

US 2014/0306427 A1    Oct. 16, 2014

Related U.S. Application Data

(60) Provisional application No. 61/812,041, filed on Apr. 15, 2013.

(51) Int. Cl.
*B60D 1/28* (2006.01)
*B60D 1/52* (2006.01)
*B60D 1/155* (2006.01)

(52) U.S. Cl.
CPC ........ *B60D 1/28* (2013.01); *B60D 1/155* (2013.01); *B60D 1/52* (2013.01)

(58) Field of Classification Search
CPC ............. B60D 1/28; B60D 1/52; B60D 1/54; B60D 1/145; B60D 1/155
See application file for complete search history.

(56) References Cited

U.S. PATENT DOCUMENTS

| 2,541,356 | A | * | 2/1951 | Hansmann | 280/452 |
| 4,253,680 | A | * | 3/1981 | Albright et al. | 280/479.1 |
| 7,090,238 | B1 | * | 8/2006 | Moore | 280/507 |
| 2011/0272919 | A1 | * | 11/2011 | Dague et al. | 280/500 |

FOREIGN PATENT DOCUMENTS

| DE | 3230364 A1 | * | 2/1984 | B60D 1/06 |
| DE | 3827842 A1 | * | 2/1990 | B60D 1/14 |
| DE | 4232983 A1 | * | 4/1994 | B60D 1/155 |
| EP | 0593983 | * | 4/1994 | B60D 1/52 |
| EP | 0869049 | * | 10/1998 | B60D 1/155 |
| FR | 1025511 | * | 4/1953 | B60D 1/155 |

* cited by examiner

*Primary Examiner* — Joseph Rocca
*Assistant Examiner* — Maurice Williams
(74) *Attorney, Agent, or Firm* — Ming Chow; Sinorica, LLC

(57) ABSTRACT

A trailer hitch receiver locking apparatus includes a main frame, a first pin assembly, a second pin assembly, a locking mechanism, and an automatically engaging safety mechanism. The first pin assembly and the second pin assembly are engaged in between the main frame and the locking mechanism in such way that the first pin assembly and the second pin assembly are operated in between a locked configuration and an unlocked configuration by the locking mechanism. The main frame is connected with the hitch receiver so that the trailer hitch receiver locking apparatus is able to secure different hitch devices with the hitch receiver through operation of the automatically engaging safety mechanism, the locking mechanism, the first pin assembly, and the second pin assembly.

20 Claims, 15 Drawing Sheets ated safety mechanism 5 out of the engaged position and switch into a disengaged position. As a result, the users are able to pivotally move the locking mechanism 4 in order to switch the locking mechanism 4 into the unlocked configuration from the locked configuration.

TRAILER HITCH RECEIVER LOCKING APPARATUS

The current application claims a priority to the U.S. Provisional Patent application Ser. No. 61/812,041 filed on Apr. 15, 2013.

FIELD OF THE INVENTION

The present invention relates generally to trailer hitches. More specifically, a novel trailer hitch apparatus that is configured to provide a unique locking mechanism for releaseably; securing a trailer hitch or other attachable apparatus to a trailer hitch receiver by manipulating a single lever arm.

BACKGROUND OF THE INVENTION

Many different devices have been constructed over the years to releasably attach trailers and other assorted devices to the rear of a vehicle. These include, but are not limited to a wide variety of ball and socket configurations. In recent years there has been increasing use in the automotive industry of square channel hitch devices that provide adaptability for a wide range of applications and include the benefit of lateral and vertical rigidity and stability when desired for a particular application. These devices are commonly known as "universal hitch receivers". Such hitch receivers comprise a square metal channel that is mounted to the underside of a tow vehicle and projects outward, away from the back end of the tow vehicle. The channel is open at the end to receive a wide verity of hitch devices that can thereby be inserted into the channel and secured to the tow vehicle. The hitch receiver has a pair of matching pin holes positioned on opposite sides of the hitch receiver that mate with corresponding holes on the tongue of any trailer of other hitch devices. The hitch devices are designed to attach to the hitch receiver as a pin or bolt is inserted through the pin holes of the hitch receiver and corresponding holes of the hitch devices when the tongue is positioned within the hitch receiver. Typically, a cotter pin is used to retain the pin or bolt within the pin holes and the corresponding holes. However, securing such hitch devices to the hitch receiver can be cumbersome and somewhat time consuming. Additionally, users may have use tools such as pliers and hammers in order to properly position the cotter pin.

It is therefore an object of the present invention to introduce a device that can readily and releasably secure a hitch device to a universal hitch receiver with a minimal amount of effort. The present invention can be retrofitted into universal hitch receivers or can be manufactured with the hitch receivers so that the present invention is able to secure hitch devices. A locking mechanism of the present invention allows the users to easily interchange different hitch devices with the hitch receiver while an automatically engaging safety mechanism provides additional security to the present invention so that accidental separation of the hitch devices and the hitch receiver can be completely eliminated. Additionally, the users don't have to use any kind tools to secure a hitch device into the hitch receiver as the present invention provides seamless connection between the hitch device and the hitch receiver.

DETAIL DESCRIPTIONS OF THE INVENTION

All illustrations of the drawings are for the purpose of describing selected versions of the present invention and are not intended to limit the scope of the present invention.

Figure 1:
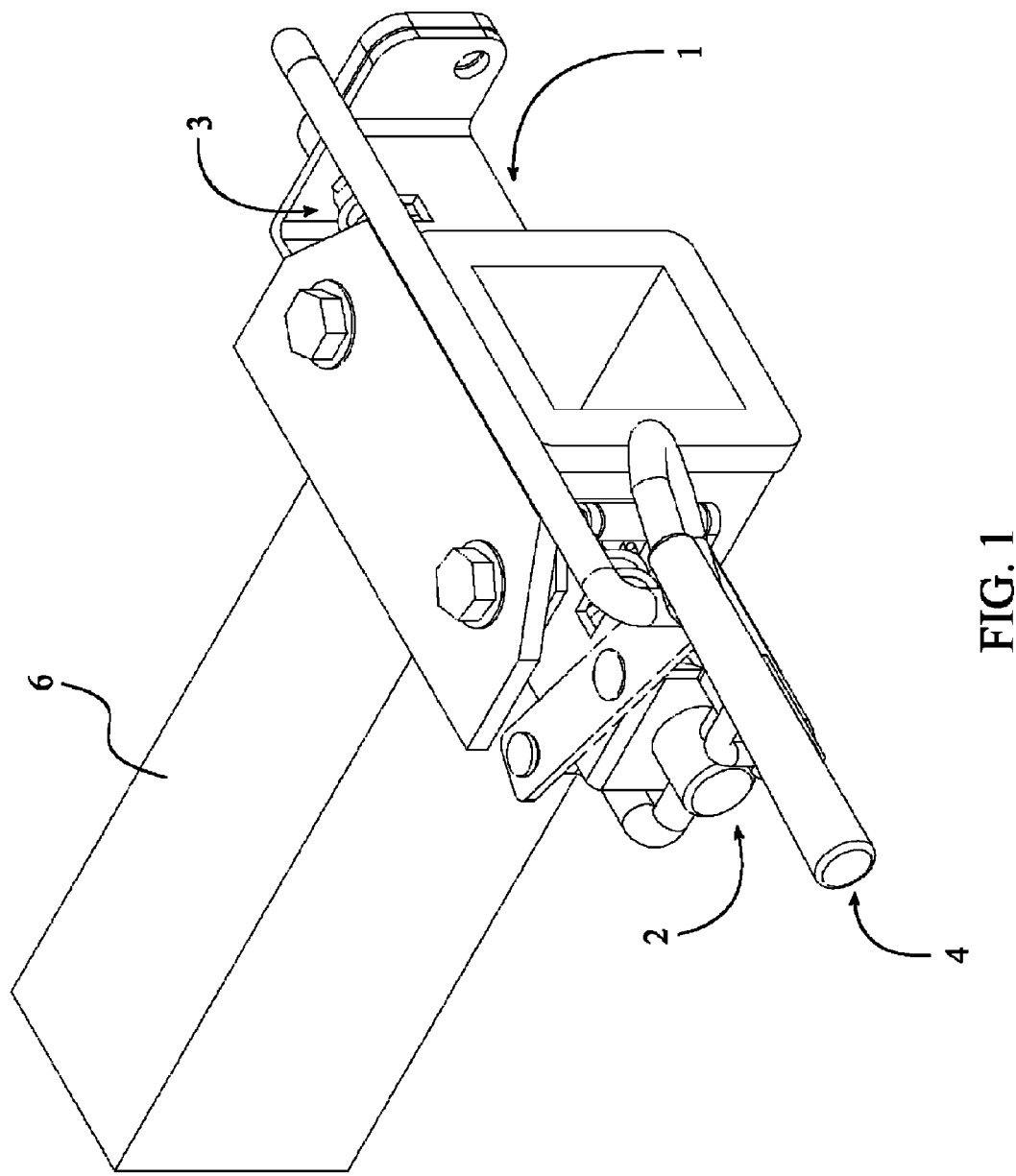
FIG. 1 is a left perspective view of the present invention, wherein the present invention is connected with the hitch receiver.
Figure 2:
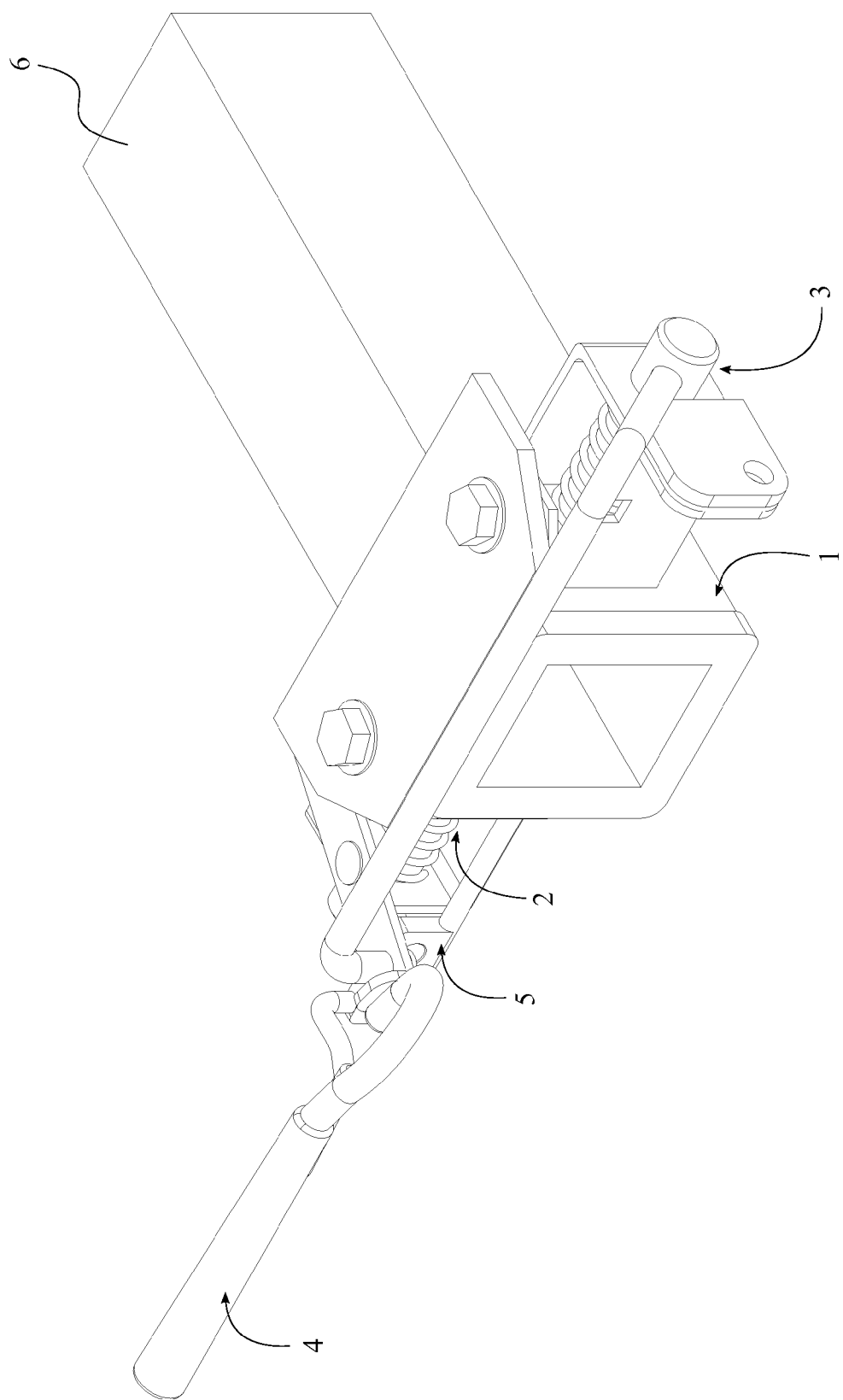
FIG. 2 is a right perspective view of the present invention, wherein the present invention is connected with the hitch receiver.

In reference to FIG. 1 and FIG. 2, the present invention is a trailer hitch receiver locking apparatus that can be either retrofitted into an existing hitch receiver 6 or pre-fabricated with the hitch receiver 6, where the functionality of the present invention remains consistent whether the trailer hitch receiver locking apparatus is retrofitted or pre-fabricated. The present invention allows the users to easily interchange different hitch devices with the hitch receiver 6 of the vehicle as the respective hitch device is secured to the hitch receiver 6 through the present invention with minimal amount of effort. The present invention comprises a main frame 1, a first pin assembly 2, a second pin assembly 3, a locking mechanism 4, and an automatically engaging safety mechanism 5. In reference to the general configuration of the present invention, the first pin assembly 2 is engaged with a first pin housing 12 and a pin guide 11 of the main frame 1, and the second pin assembly 3 is engaged with a second pin housing 13 of the main frame 1 and the pin guide 11. The locking mechanism 4 is pivotally connected with the first pin housing 12 and engaged in between the first pin assembly 2 and the second pin assembly 3 so that the locking mechanism 4 is able to move the present invention in between a locked configuration and an unlocked configuration. The automatically engaging safety mechanism 5 is normally positioned in an engaged position within the present invention with respect to the locked configuration of the locking mechanism 4 so that the locking mechanism 4 does not inadvertently switch into the unlocked configuration. When the locking mechanism 4 needs to be switched into the unlocked configuration from the locked configuration, the users need to move the automatically engaging safety mechanism 5 into a disengaged configuration so that the locking mechanism 4 can be switched into the unlocked configuration.

Figure 7:
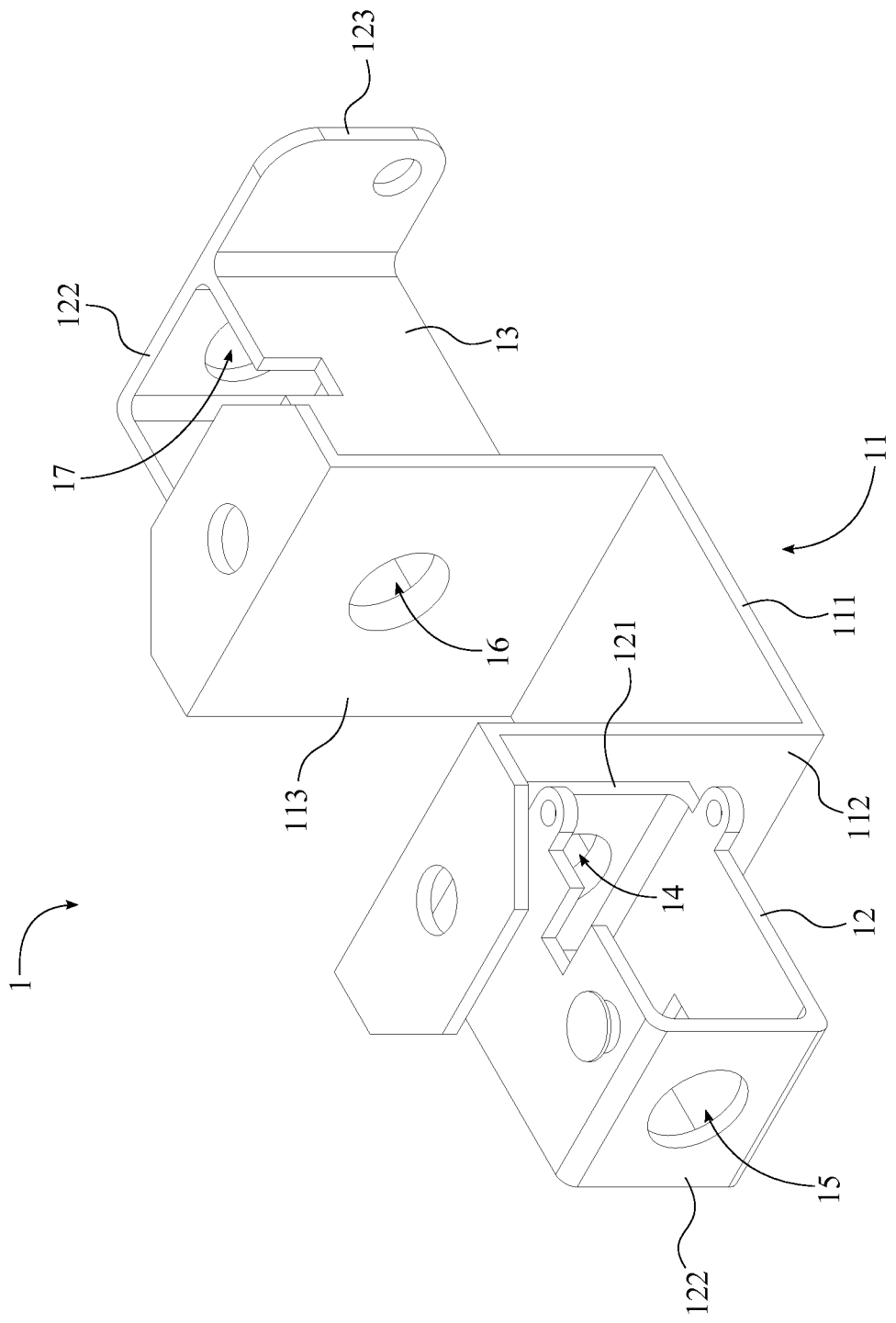
FIG. 7 is a perspective view of the main frame of the present invention.
Figure 8:
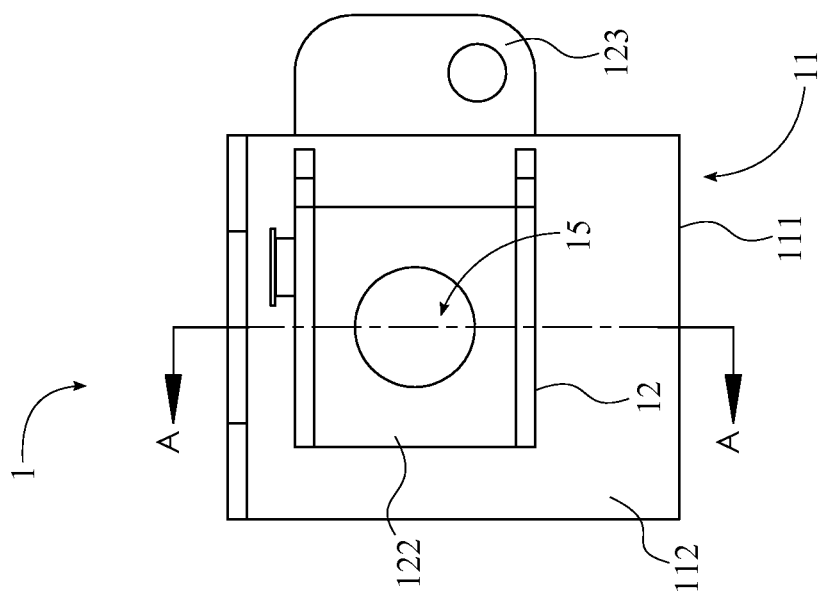
FIG. 8 is a side view of the main frame of the present invention, showing the plane upon which a cross sectional view is taken shown in FIG. 9.
Figure 9:
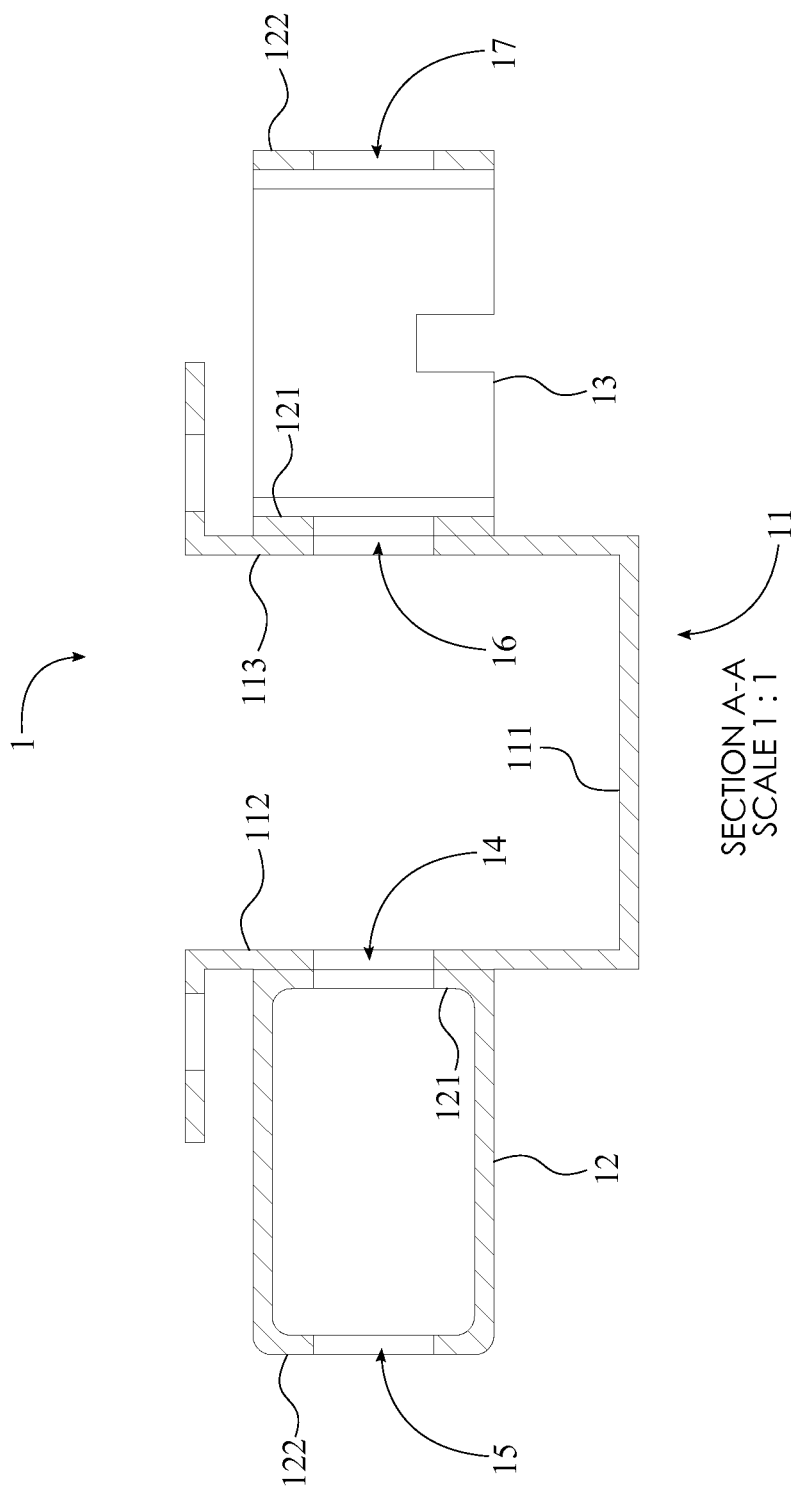
FIG. 9 is a cross section view of the main frame of the present invention taken along line A-A of FIG. 8.

In reference to FIG. 7, FIG. 8, and FIG. 9, the main frame 1 further comprises a first proximal cavity 14, a first distal cavity 15, a second proximal cavity 16, and a second distal cavity 17 in addition to the pin guide 11, the first pin housing 12, and the second pin housing 13. In the preferred embodiment of the present invention, the pin guide 11, which is normally connected to the hitch receiver 6, is a U-shaped channel that comprises a base 111, a first wall 112, and a second wall 113. The first wall 112 and the second wall 113 are perpendicularly connected with the base 111, where the first wall 112 and the second wall 113 are oppositely positioned from each other along the base 111. The combination of the first wall 112, the second wall 113, and the base 111 complete the pin guide 11 so that the first wall 112 and the second wall 113 are tightly positioned with the left side and the right side of the hitch receiver 6, and the base 111 is tightly positioned with the bottom side of the hitch receiver 6 from below. The first pin housing 12 and the second pin housing 13 are linearly and externally connected with the pin guide 11 opposite of each other. More specifically, a proximal end 121 of the first pin housing 12 is adjacently connected to the first wall 112, where the proximal end 121 of first pin housing 12 is oppositely positioned from the second wall 113. The distal end 122 of the first pin housing 12 is oppositely positioned from the proximal end 121 of the first pin housing 12, where the first pin housing 12 extends from the proximal end 121 to the distal end 122. Similarly, a proximal end 121 of the second pin housing 13 is adjacently connected to the second wall 113, where the proximal end 121 of second pin housing 13 is oppositely positioned from the first wall 112. The distal end 122 of the second pin housing 13 is oppositely positioned from the proximal end 121 of the second pin housing 13, where the second pin housing 13 extends from the proximal end 121 to the distal end 122. The second pin housing 13 further comprises a locking plate 123. The locking plate 123 is adjacently connected with the distal end 122 of the second pin housing 13 and positioned parallel with the distal end 122 of the second pin housing 13. In an alternative embodiment of the present invention, the pin guide 11 can be built into a vehicle as an original equipment manufacturer (OEM) part.

In reference to FIG. 7 and FIG. 9, the first distal cavity 15 is traversed through the distal end 122 of the first pin housing 12, and the first proximal cavity 14 is traversed through the proximal end 121 of the first pin housing 12 and the first wall 112. The first distal cavity 15 and the first proximal cavity 14 are positioned within the first pin housing 12 and the first wall 112 so that the first pin housing 12 and the pin guide 11 are able to utilize the first pin assembly 2. Similarly, the second distal cavity 17 is traversed through the distal end 122 of the second pin housing 13, and the second proximal cavity 16 is traversed through the proximal end 121 of the second pin housing 13 and the second wall 113. The second distal cavity 17 and the second proximal cavity 16 are positioned within the second pin housing 13 and the second wall 113 so that the second pin housing 13 and the pin guide 11 are able to utilize the second pin assembly 3. The first distal cavity 15, the first proximal cavity 14, the second distal cavity 17, and the second proximal cavity 16 are concentrically positioned with each other so that the main frame 1 can be properly aligned against a left pin hole and a right pin hole of the hitch receiver 6.

Figure 10:
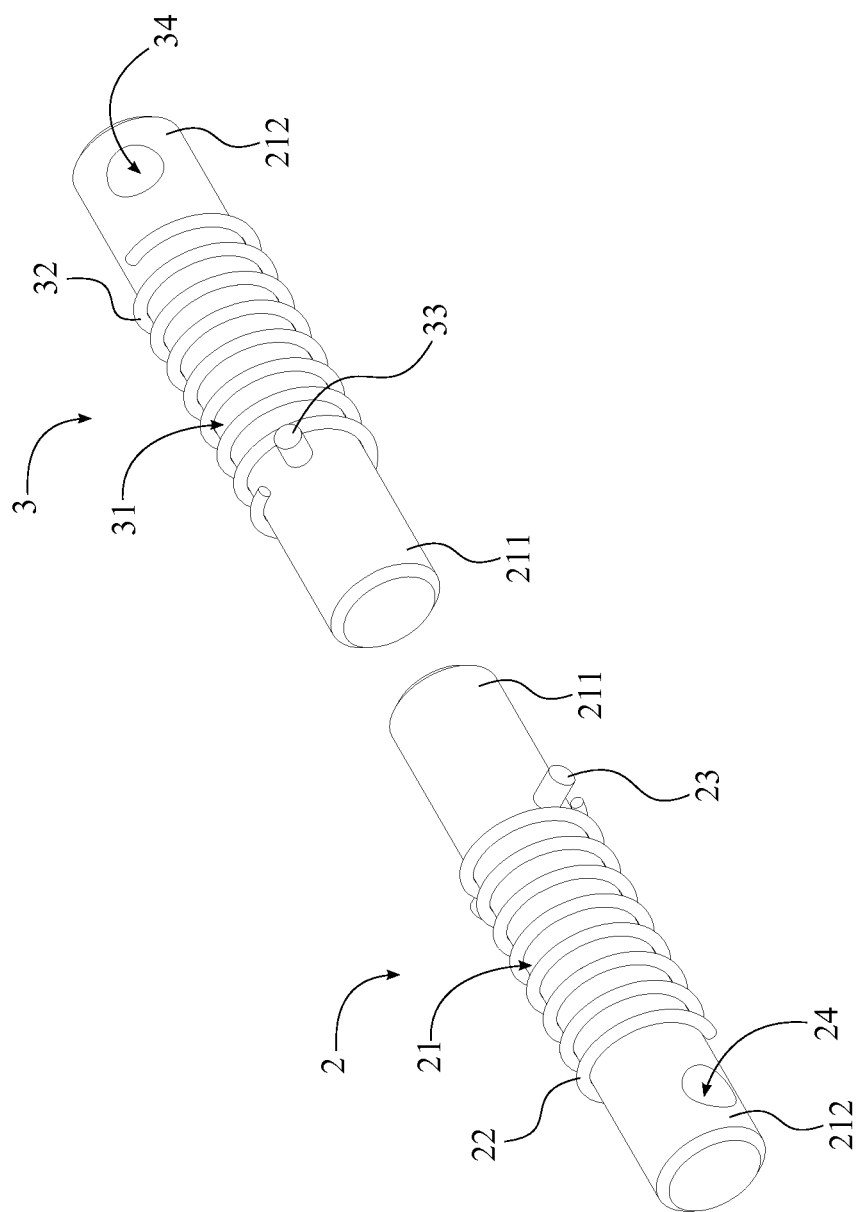
FIG. 10 is a perspective view of the first pin assembly and the second pin assembly of the present invention.

In reference to FIG. 10, the first pin assembly 2 comprises a first locking pin 21, a first compression spring 22, a first stop pin 23, and a first cavity 24, where the first locking pin 21 comprises a locking end 211 and a connecting end 212. The locking end 211 of the first locking pin 21 is oppositely positioned from the connecting end 212 of the first locking pin 21 along the first locking pin 21. The first stop pin 23 is traversed through the first locking pin 21 in such way that the first stop pin 23 is adjacently positioned with the locking end 211 of the first locking pin 21. The first cavity 24 is traversed through the first locking pin 21, where the first cavity 24 is adjacently positioned with the connecting end 212 of the first locking pin 21. The first compression spring 22 is concentrically positioned around the first locking pin 21 and positioned in between the first cavity 24 and the first stop pin 23.

Figure 15:
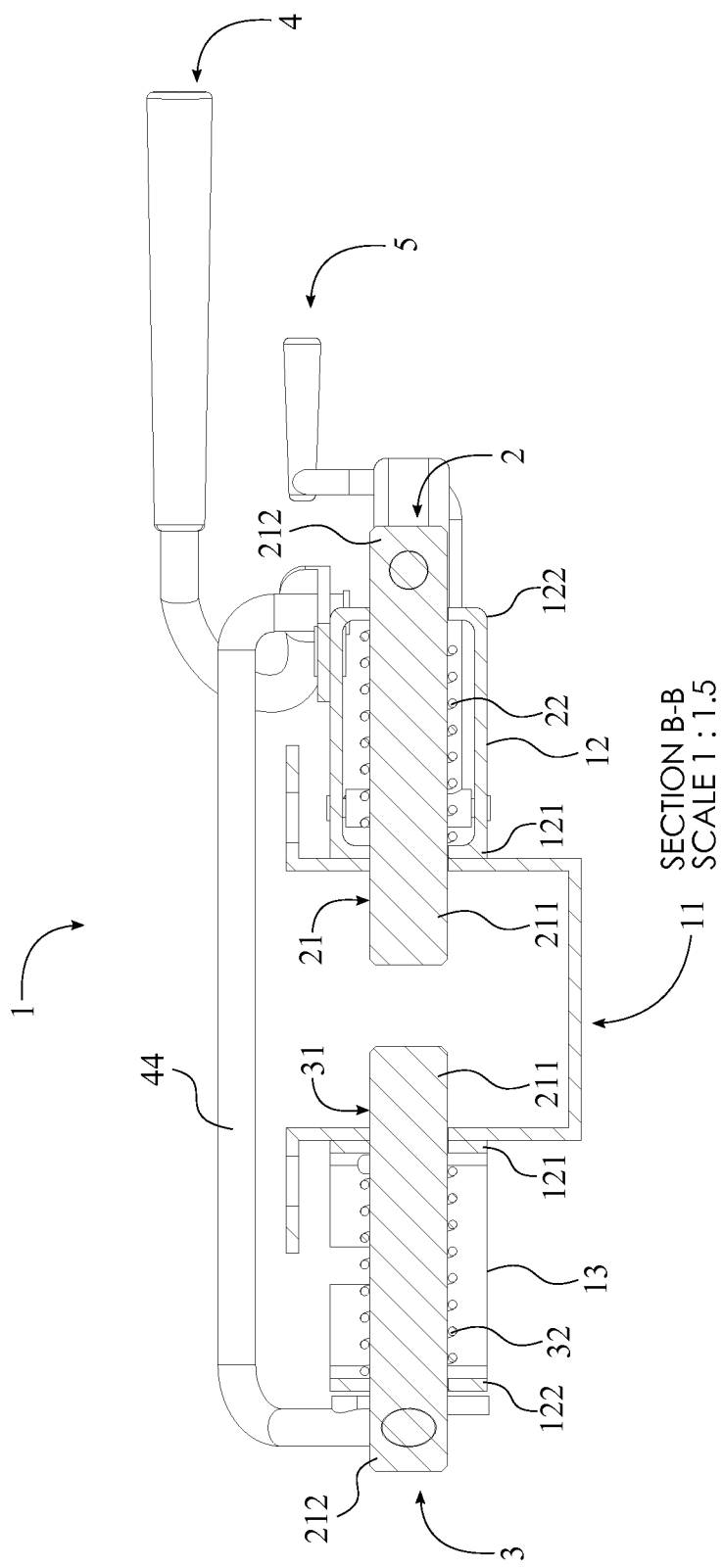
FIG. 15 is a cross section view of the present invention taken along line B-B of FIG. 14.

In reference to FIG. 7, FIG. 10, and FIG. 15, the configuration of the first pin assembly 2 and the first pin housing 12, the connecting end 212 of the first locking pin 21 is concentrically positioned within the first distal cavity 15, and the locking end 211 of the first locking pin 21 is concentrically positioned within the first proximal cavity 14. The first stop pin 23 is adjacently positioned with the proximal end 121 of the first pin housing 12 as the first compression spring 22 is positioned in between the distal end 122 of the first pin housing 12 and the first stop pin 23. The first cavity 24 is adjacently and externally positioned with the distal end 122 of the first pin housing 12. The first locking pin 21 is able to axially move within the first pin housing 12 through the first distal cavity 15 and the first proximal cavity 14. More specifically, the inward movement of the first locking pin 21 is restricted by the first stop pin 23 as the first stop pin 23 comes into contact with the proximal end 121 of the first pin housing 12, and the outward movement of the first locking pin 21 is controlled by the locking mechanism 4.

Similar to the first pin assembly 2, the second pin assembly 3 comprises a second locking pin 31, a second compression spring 32, a second stop pin 33, and a second cavity 34, where the second locking pin 31 also comprises the locking end 211 and the connecting end 212. In reference to FIG. 10, the locking end 211 of the second locking pin 31 is oppositely positioned from the connecting end 212 of the second locking pin 31 along the second locking pin 31. The second stop pin 33 is traversed through the second locking pin 31 in such way that the second stop pin 33 is adjacently positioned with the locking end 211 of the second locking pin 31. The second cavity 34 is traversed through the second locking pin 31, where the second cavity 34 is adjacently positioned with the connecting end 212 of the second locking pin 31. The second compression spring 32 is concentrically positioned around the second locking pin 31 and positioned in between the second cavity 34 and the second locking pin 31.

In reference to FIG. 7, FIG. 10, FIG. 14, and FIG. 15, the configuration of the second pin assembly 3 and the second pin housing 13, the connecting end 212 of the second locking pin 31 is concentrically positioned within the second distal cavity 17, and the locking end 211 of the second locking pin 31 is concentrically positioned within the second proximal cavity 16. The second stop pin 33 is adjacently positioned with the proximal end 121 of the second pin housing 13 as the second compression spring 32 is positioned in between the distal end 122 of the second pin housing 13 and the second stop pin 33. The second cavity 34 is adjacently and externally positioned with the distal end 122 of the second pin housing 13. The second locking pin 31 is able to axially move within the second pin housing 13 through the second distal cavity 17 and the second proximal cavity 16. More specifically, the inward movement of the second locking pin 31 is restricted by the second stop pin 33 as the second stop pin 33 comes into contact with the proximal end 121 of the second pin housing 13, and the outward movement of the second locking pin 31 is controlled by the locking mechanism 4.

Figure 11:
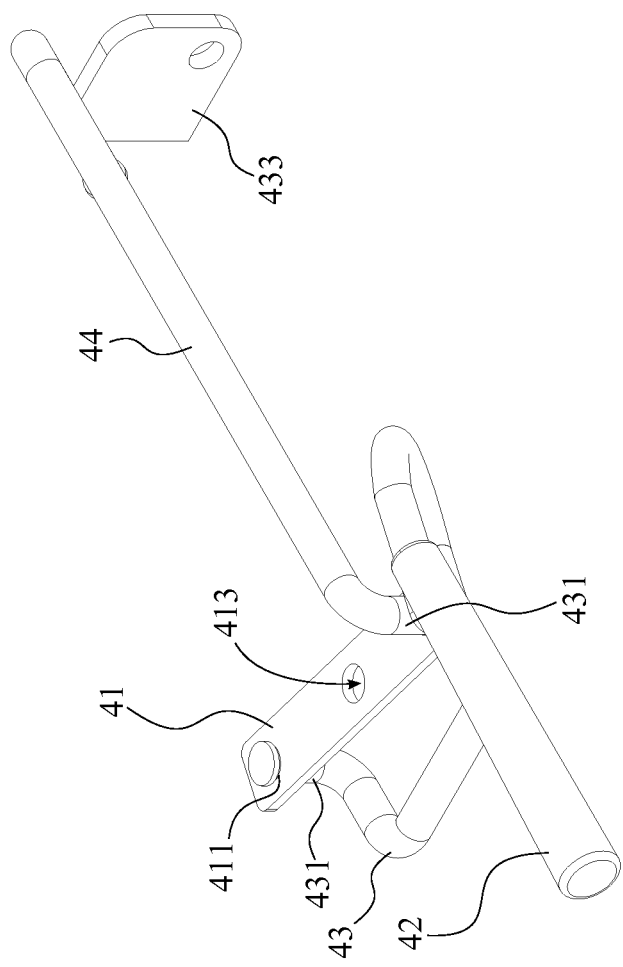
FIG. 11 is a perspective view of the locking mechanism of the present invention.
Figure 12:
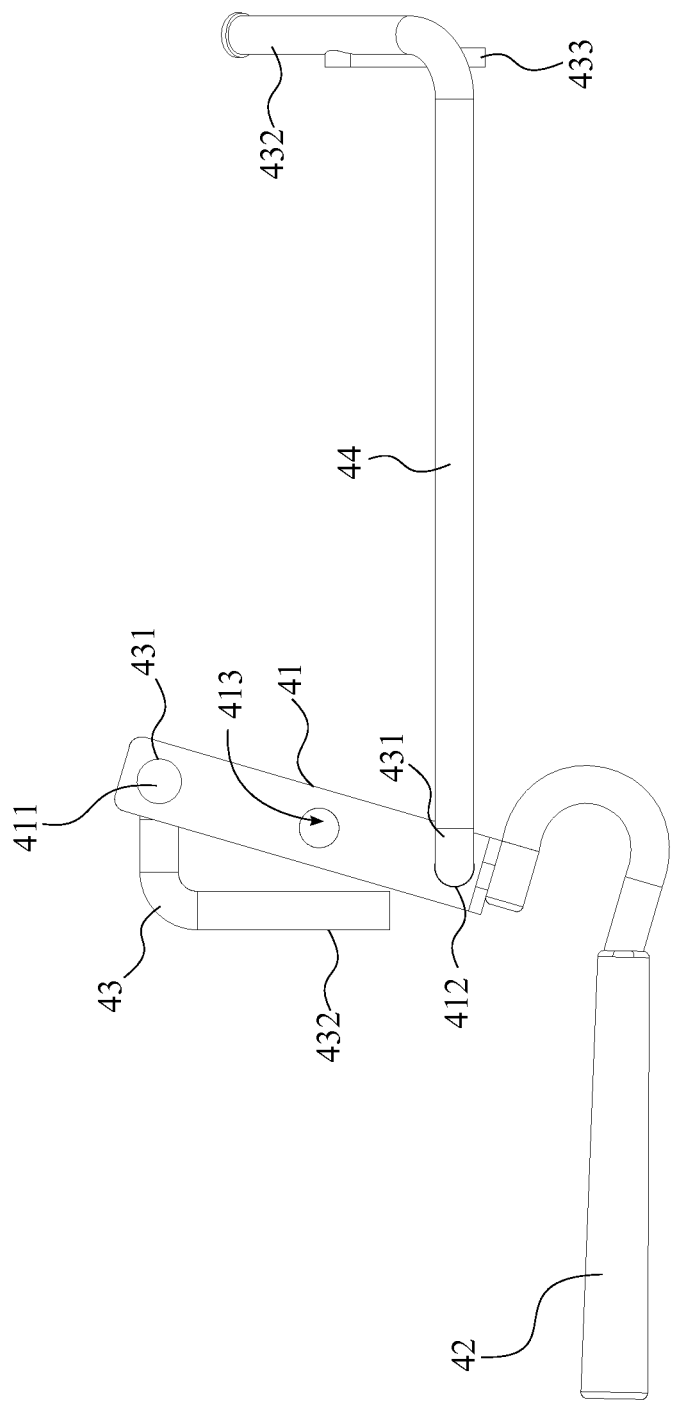
FIG. 12 is a top view of the locking mechanism of the present invention.

In reference to FIG. 11 and FIG. 12, the locking mechanism 4 can operate between the locked configuration and the unlocked configuration. In the preferred embodiment of the present invention, the locking mechanism 4 comprises a pivot plate 41, a locking handle 42, a first linkage rod 43, and a second linkage rod 44. A first plate hole 411, a second plate hole 412, and a third plate hole 413 of the pivot plate 41 are traversed through the pivot plate 41, where the third plate hole 413 is linearly positioned in between the first plate hole 411 and the second plate hole 412. The first linkage rod 43 and the second linkage rod 44 each comprise a plate-connecting end 431 and a pin-connecting end 432, where the plate-connecting end 431 and the pin-connecting end 432 are oppositely positioned from each other along the first linkage rod 43 and the second linkage rod 44. The locking handle 42 that allows the users control the locking mechanism 4 is connected with the pivot plate 41 adjacent to the second plate hole 412. The pivot plate 41 is pivotally connected with the first pin housing 12 through the third plate hole 413 so that the pivot plate 41 is able to pivot about the third plate hole 413. The first linkage rod 43 engages in between the locking mechanism 4 and the first pin assembly 2, and the second linkage rod 44 engages in between the locking mechanism 4 and the second pin assembly 3. More specifically, the plate-connecting end 431 of the first linkage rod 43 is slidably engaged with the first plate hole 411 while the pin-connecting end 432 of the first linkage rod 43 is slidably engaged with the first cavity 24. Similarly, the plate-connecting end 431 of the second linkage rod 44 is slidably engaged with the second plate hole 412 while the pin-connecting end 432 of the second linkage rod 44 is slidably engaged with the second cavity 34. The configuration between the pivot plate 41, the first pin assembly 2, and the second pin assembly 3 through the first linkage rod 43 and the second linkage rod 44 allows the locking mechanism 4 to move in between the locked configuration and the unlocked configuration. A retainer plate 433 of the locking mechanism 4 is adjacently connected with the pin-connecting end 432 of the second linkage rod 44, where the retainer plate 433 is positioned parallel with the locking plate 123. In an alternative embodiment of the present invention, the locking mechanism 4 uses solenoids to actuate the movement of the first locking pin 21 and the second locking pin 31 through the pin guide 11.

Figure 3:
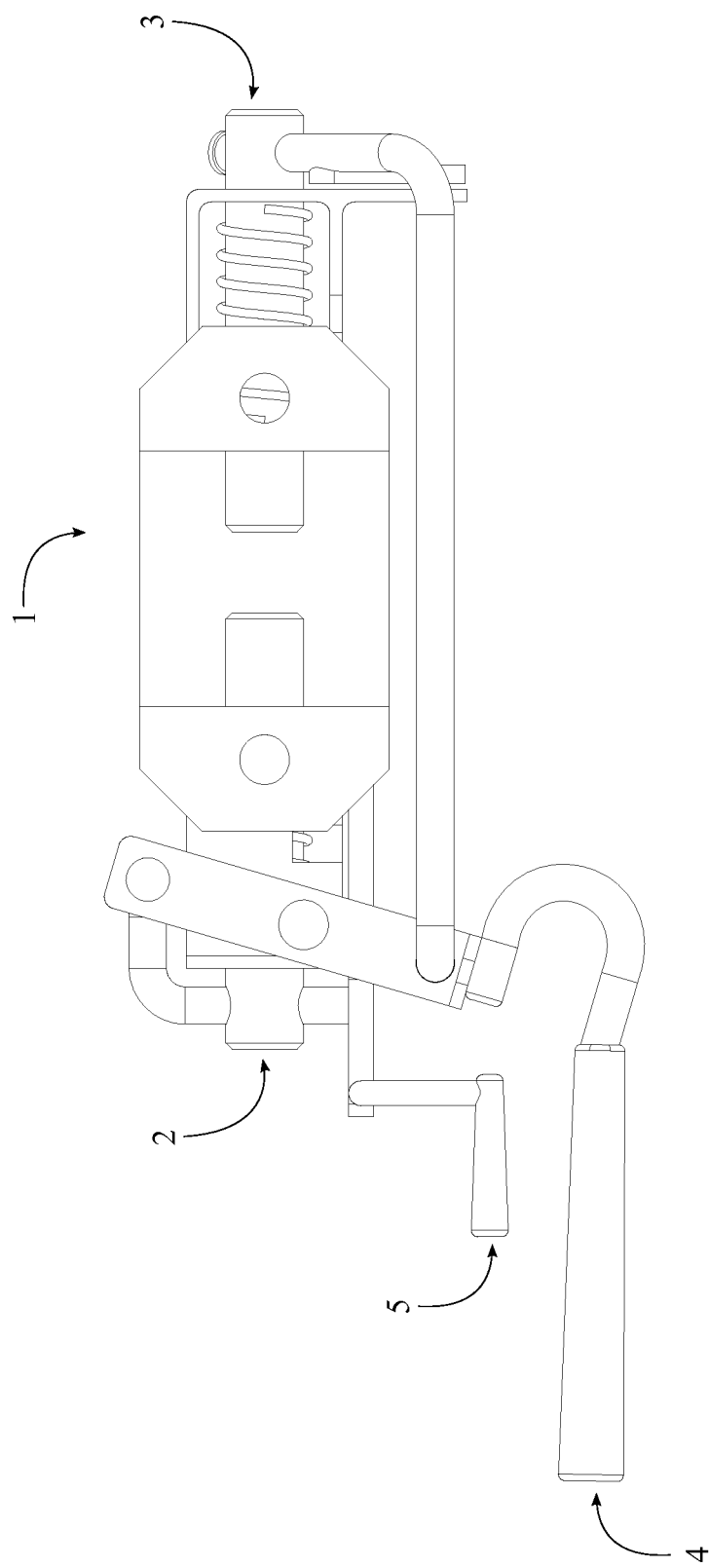
FIG. 3 is a top view of the present invention, where the present invention is at the locked configuration.
Figure 5:
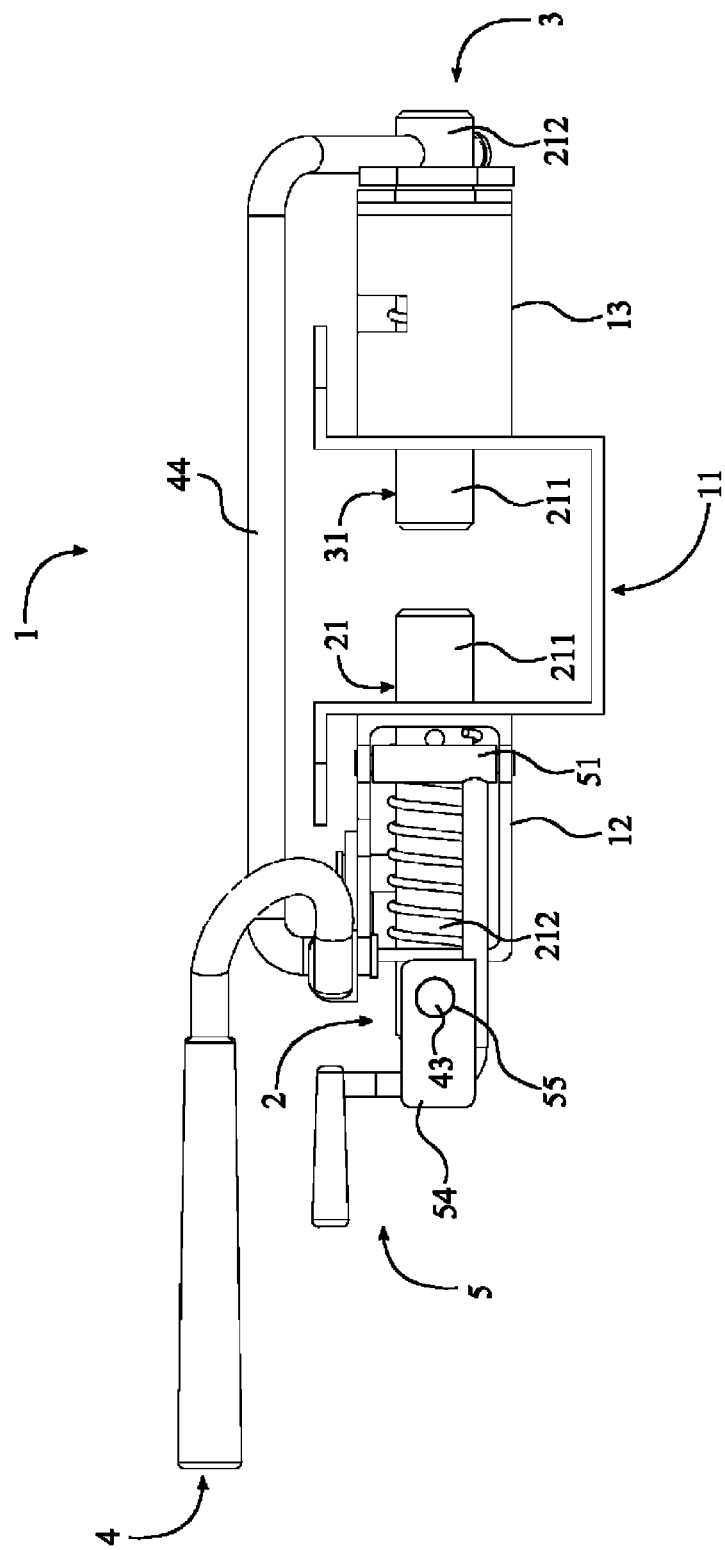
FIG. 5 is a front view of the present invention, where the present invention is at the locked configuration.

In reference to the locked configuration of the present invention as shown in FIG. 3 and FIG. 5, the locking end 211 of the first locking pin 21 is extended into the hitch receiver 6 through the left pin hole, and the locking end 211 of the second locking pin 31 is extended into the hitch receiver 6 through the right pin hole. Since the locking ends 211 of the first locking pin 21 and the second locking pin 31 are extended into the hitch receiver 6, the users are able to secure any kind of hitch devices with the hitch receiver 6 through the present invention. Additionally, the retainer plate 433 is adjacently positioned with the locking plate 123 in such way that the users are able to secure both the retainer plate 433 and the locking plate 123 together with a padlock or any other type of similar securing device. Since the retainer plate 433 and the locking plate 123 can be secured together in order to restrict the movement of the second linkage rod 44, accidental movement of the locking mechanism 4 from the locked configuration into the unlocked configuration is completely restricted within the present invention.

Figure 4:
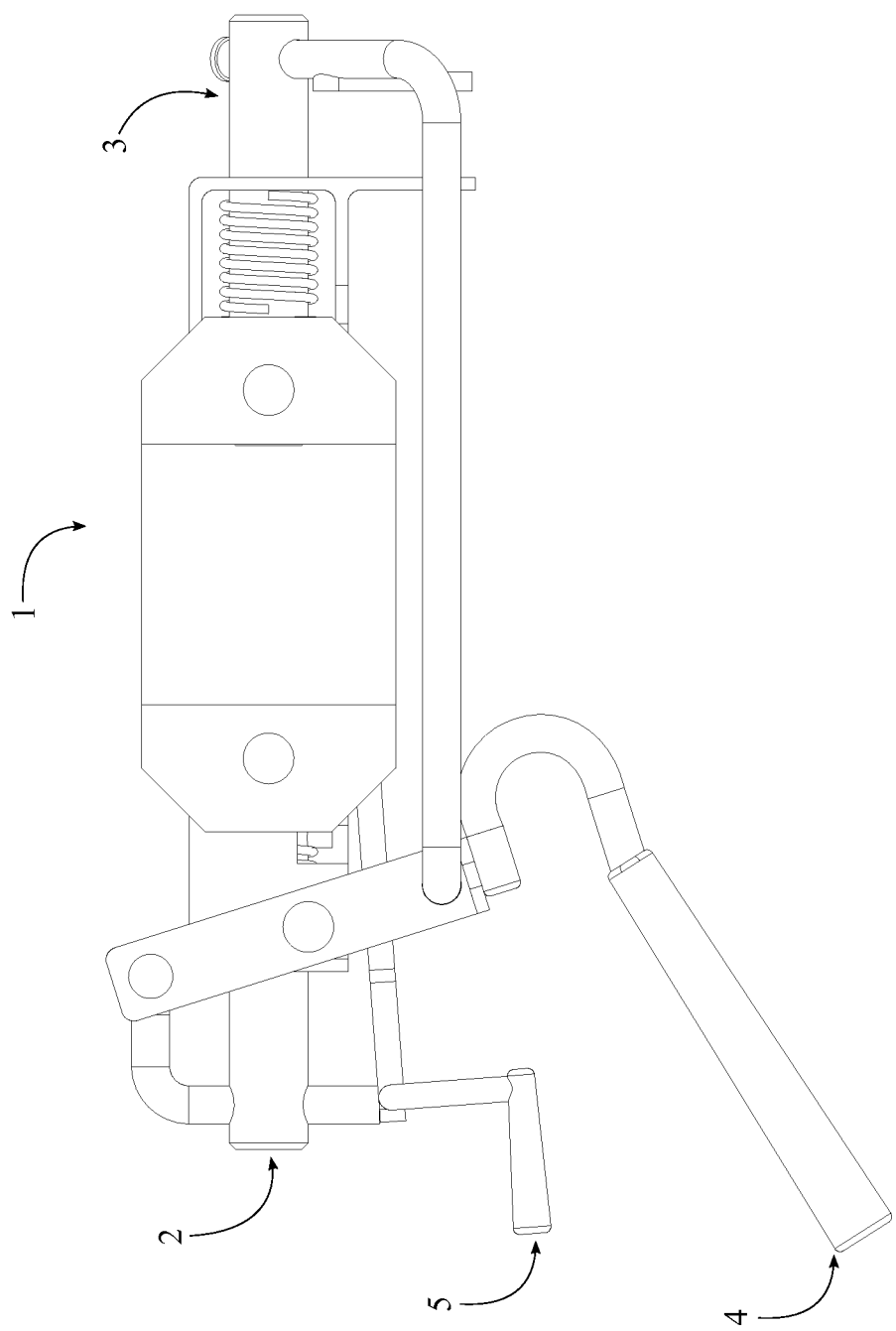
FIG. 4 is a top view of the present invention, where the present invention is at the unlocked configuration.
Figure 6:
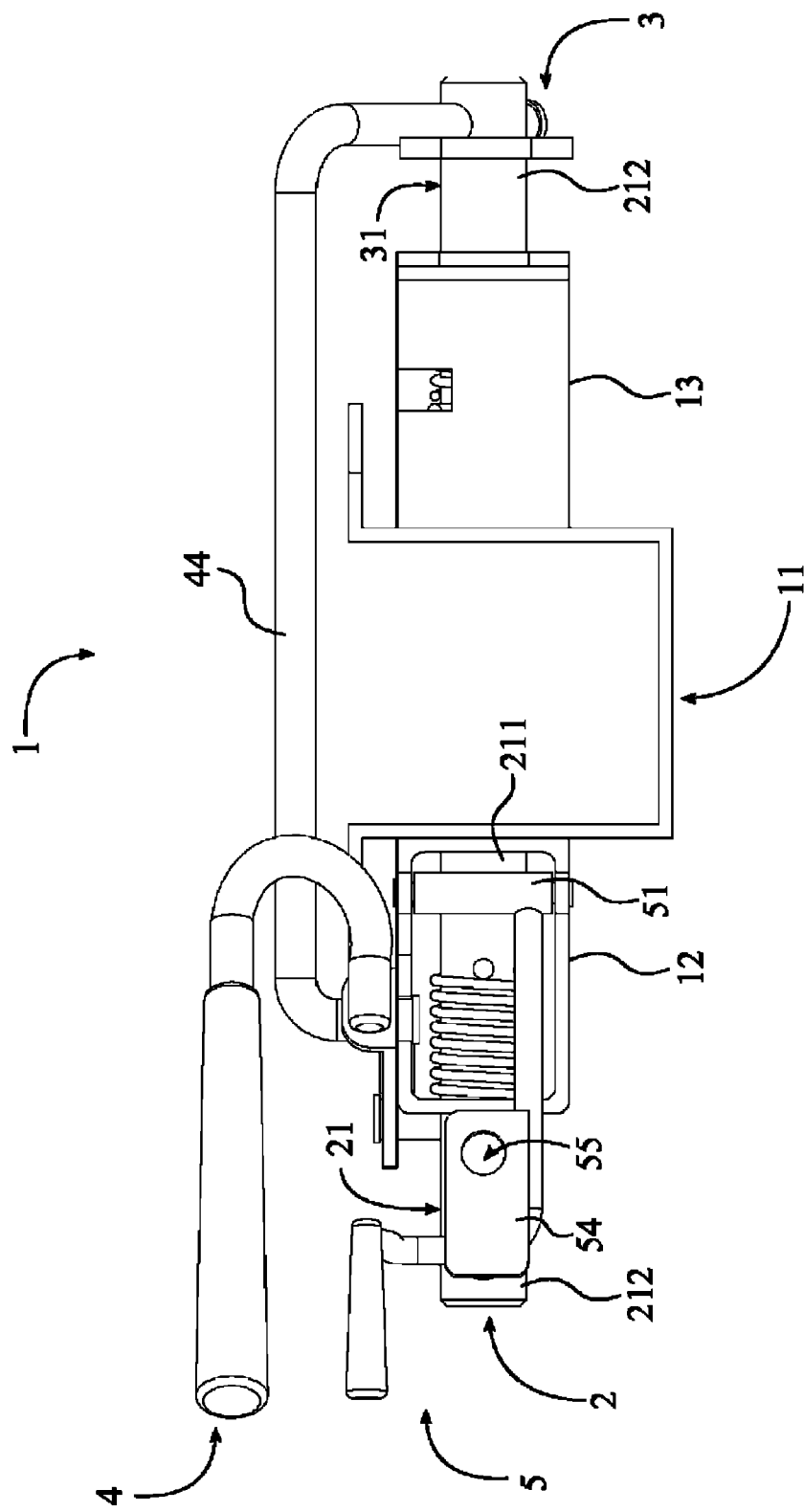
FIG. 6 is a front view of the present invention, where the present invention is at the unlocked configuration.

In reference to the unlocked configuration of the present invention as shown in FIG. 4 and FIG. 6, the locking end 211 of the first locking pin 21 is retracted from the hitch receiver 6 through the left pin hole, and the locking end 211 of the second locking pin 31 is retracted from the hitch receiver 6 through the right pin hole. Since the locking ends 211 of the first locking pin 21 and the second locking pin 31 are retracted from the hitch receiver 6, the users are able to remove the attached hitch device from the hitch receiver 6 as the present invention disengages the attached hitch device from the hitch receiver 6. Prior to moving the locking mechanism 4 from the locked configuration to the unlocked configuration, the users need to remove any securing device container in between the retainer plate 433 and the locking plate 123.

The automatically engaging safety mechanism 5 comprises a spring loaded hinge 51, an extension lever 52, a safety handle 53, a locking tab 54, and a locking hole 55. The spring loaded hinge 51 is connected with the first pin housing 12 adjacent to the proximal end 121. The extension lever 52 is perpendicularly connected with the spring loaded hinge 51, and the safety handle 53 is connected with the extension lever 52. The extension lever 52 and the safety handle 53 are positioned in such way that the extension lever 52 and the safety handle 53 provide sufficient clearance for the automatically engaging safety mechanism 5 in order to move back and forth in between the engaged configuration and the disengaged configuration. The locking tab 54 is connected along the extension lever 52 adjacent to the safety handle 53 as the locking hole 55 is traversed through the locking tab 54.

Figure 13:
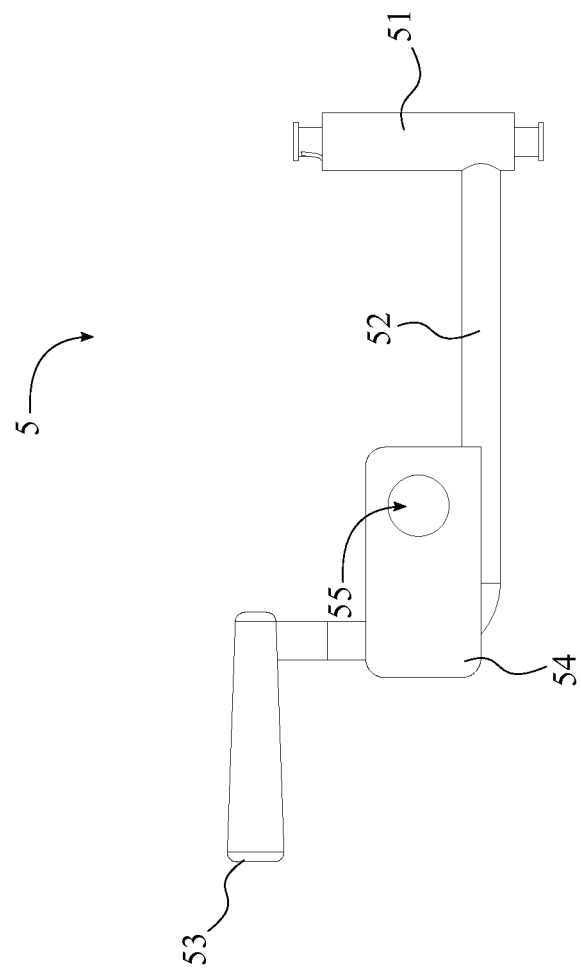
FIG. 13 is a front view of the automatically engaging safety mechanism of the present invention.
Figure 14:
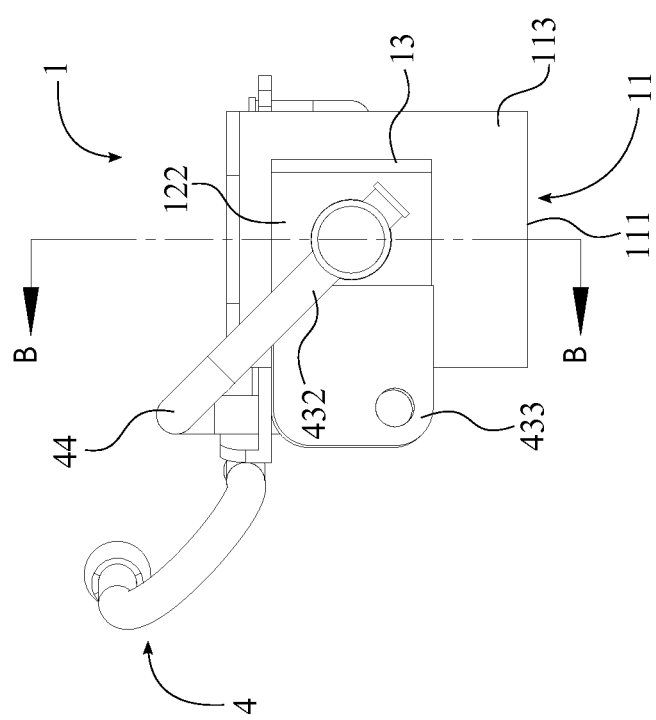
FIG. 14 is a side view of the present invention, showing the plane upon which a cross sectional view is taken shown in FIG. 15.

In reference to FIG. 6 and FIG. 13, the automatically engaging safety mechanism 5 is normally positioned in the engaged configuration as the locking mechanism 4 positions within the locked configuration. More specifically, the pin-connecting end 432 of the first linkage rod 43 is concentrically engaged with the locking hole 55 in such way that the locking tab 54 is positioned parallel with the first pin housing 12. Due to the engaged configuration of the automatically engaging safety mechanism 5, the locked configuration of the locking mechanism 4 can be contained within the present invention, where the locking ends 211 of the first locking pin 21 and the second locking pin 31 are respectively engaged with the hitch devices through the left pin hole and the right pin hole. The users need to move the automatically engaging safety mechanism 5 into the disengaged configuration before moving the locking mechanism 4 into the unlocked configuration. When the automatically engaging safety mechanism 5 is moved into the disengaged configuration, the pin-connecting end 432 of the first linkage rod 43 is disengaged from the locking hole 55 and adjacently positioned behind the locking tab 54. Then locking mechanism 4 can be moved into the unlocked configuration. As a result, the locking tab 54 is angularly positioned with the first pin housing 12 as the pin-connecting end 432 of the first linkage rod 43 slides along the locking tab 54. Then the locking ends 211 of the first locking pin 21 and the second locking pin 31 are respectively disengaged from the hitch devices through the left pin hole and the right pin hole. More specifically, the first linkage rod 43 pulls the first locking pin 21 while the second linkage rod 44 simultaneously pulls the second locking pin 31. Once the users release the locking handle 42 of locking mechanism 4, the locking mechanism 4 automatically moves back into the locked configuration, and the automatically engaging safety mechanism 5 moves back into the engaged configuration. More specifically, the potential energy created within the first compression spring 22 and the second compression spring 32 during the unlocked configuration pushes both the first locking pin 21 and the second locking pin 31 back into the locked configuration. Then the potential energy created within the spring loaded hinge 51 forces the automatically engaging safety mechanism 5 to return back to the engaged configuration.

Although the invention has been explained in relation to its preferred embodiment, it is to be understood that many other possible modifications and variations can be made without departing from the spirit and scope of the invention as hereinafter claimed.

What is claimed is:

1. A trailer hitch receiver locking apparatus comprises:
a main frame;
a first pin assembly;
a second pin assembly;
a locking mechanism;
an automatically engaging safety mechanism;
the main frame comprises a pin guide, a first pin housing, a second pin housing, a first proximal cavity, a first distal cavity, a second proximal cavity, and a second distal cavity;
the first pin housing and the second pin housing each comprise a proximal end and a distal end;
the first pin assembly comprises a first locking pin, a first compression spring, a first stop pin, and a first cavity;
the second pin assembly comprises a second locking pin, a second compression spring, a second stop pin, and a second cavity;
the first locking pin and the second locking pin each comprise a locking end and a connecting end;
the automatically engaging safety mechanism comprises a spring loaded hinge, extension lever, a safety handle, a locking tab, and a locking hole;
the first pin assembly being engaged with the first pin housing and the pin guide;
the second pin assembly being engaged with the second pin housing and the pin guide; and
the locking mechanism being pivotally connected with the first pin housing and engaged within, between the first pin assembly and the second pin assembly.

2. The trailer hitch receiver locking apparatus as claimed in claim 1 comprises:
the pin guide comprises a base, a first wall, and a second wall;
the first wall and the second wall being perpendicularly connected with the base;
the first wall and the second wall being oppositely positioned from each other across the base;
the proximal end of the first pin housing being adjacently connected to the first wall;
the proximal end of the first pin housing being oppositely positioned from the second wall;
the distal end of the first pin housing being oppositely positioned from the proximal end of the first pin housing;
the proximal end of the second pin housing being adjacently connected to the second wall;
the proximal end of the second pin housing being oppositely positioned from the first wall;
the distal end of the second pin housing being oppositely positioned from the proximal end of the second pin housing;
a locking plate being adjacently connected with the distal end of the second pin housing; and
the locking plate being positioned parallel with the distal end of the second pin housing.

3. The trailer hitch receiver locking apparatus as claimed in claim 1 comprises:
the pin guide comprises a base, a first wall, and a second wall;
the first distal cavity traversing through the distal end of the first pin housing;
the first proximal cavity traversing through the proximal end of the first pin housing and the first wall;
the second distal cavity traversing through the distal end of the second pin housing;
the second proximal cavity traversing through the proximal end of the second pin housing and the second wall; and
the first distal cavity, the first proximal cavity, the second distal cavity, the second proximal cavity being concentrically positioned with each other.

4. The trailer hitch receiver locking apparatus as claimed in claim 1 comprises:
the locking end of the first locking pin being oppositely positioned from the connecting end of the first locking pin;
the first stop pin traversing through the first locking pin;
the first stop pin being adjacently positioned with the locking end of the first locking pin;
the first cavity being traversing through the first locking pin;
the first cavity being adjacently positioned with the connecting end of the first locking pin;
the first compression spring being concentrically positioned around the first locking pin; and
the first compression spring being positioned in between the first cavity and the first locking pin.

5. The trailer hitch receiver locking apparatus as claimed in claim 1 comprises:
the connecting end of the first locking pin being concentrically positioned within the first distal cavity;
the locking end of the first locking pin being concentrically positioned within the first proximal cavity;
the first stop pin being adjacently positioned with the proximal end of the first pin housing;
the first compression spring being positioned in between the distal end of the first pin housing and the first stop pin; and
the first cavity being adjacently and externally positioned with the distal end of the first pin housing.

6. The trailer hitch receiver locking apparatus as claimed in claim 1 comprises:
the locking end of the second locking pin being oppositely positioned from the connecting end of the second locking pin;
the second stop pin traversing through the second locking pin;
the second stop pin being adjacently positioned with the locking end of the second locking pin;
the second cavity being traversing through the second locking pin;
the second cavity being adjacently positioned with the connecting end of the second locking pin;
the second compression spring being concentrically positioned around the second locking pin; and
the second compression spring being positioned in between the second cavity and the second locking pin.

7. The trailer hitch receiver locking apparatus as claimed in claim 1 comprises:
the connecting end of the second locking pin being concentrically positioned within the second distal cavity;
the locking end of the second locking pin being concentrically positioned within the second proximal cavity;
the second stop pin being adjacently positioned with the proximal end of the second pin housing;

the second compression spring being positioned in between the distal end of the second pin housing and the second stop pin; and the second cavity being adjacently and externally positioned with the distal end of the second pin housing.

8. The trailer hitch receiver locking apparatus as claimed in claim 1 comprises:
the locking mechanism comprises a pivot plate, a locking handle, a first linkage rod, and a second linkage rod;
the pivot plate comprises a first plate hole, a second plate hole, and a third plate hole;
the first linkage rod and the second linkage rod each comprise a plate-connecting end and a pin-connecting end;
the first plate hole, the second plate hole, and the third plate hole traversing through the pivot plate;
the third plate hole being linearly positioned in between the first plate hole and the second plate hole;
the pivot plate being pivotally connected with the first pin housing through the third plate hole;
the locking handle being connected with the pivot plate adjacent to the second plate hole;
the plate-connecting end being oppositely positioned from the pin-connecting end along the first linkage rod and the second linkage rod;
the plate-connecting end of the first linkage rod being slidably engaged with the first plate hole;
the pin-connecting end of the first linkage rod being slidably engaged with the first cavity;
the plate-connecting end of the second linkage rod being slidably engaged with the second plate hole;
the pin-connecting end of the second linkage rod being slidably engaged with the second cavity; and
a retainer plate being adjacently connected with the pin-connecting end of the second linkage rod.

9. The trailer hitch receiver locking apparatus as claimed in claim 1 comprises:
the spring loaded hinge being connected with the first pin housing adjacent to the proximal end;
the extension lever being perpendicularly connected with the spring loaded hinge;
the safety handle being connected with the extension lever;
the extension lever being positioned in between the safety handle and the spring loaded hinge;
the locking tab being connected along the extension lever adjacent to the safety handle; and
the locking hole traversing through the locking tab.

10. The trailer hitch receiver locking apparatus as claimed in claim 8 comprises:
the pin guide being connected to a hitch receiver;
the first locking pin being concentrically positioned with a left pin hole of the hitch receiver; and
the second locking pin being concentrically positioned with a right pin hole of the hitch receiver.

11. The trailer hitch receiver locking apparatus as claimed in claim 10 comprises:
wherein the automatically engaging safety mechanism is positioned in an engaged configuration;
the pin-connecting end of the first linkage rod being concentrically engaged with the locking hole;
the locking tab being positioned parallel with the first pin housing;
the locking end of the first locking pin being engaged with a hitch device through the left pin hole; and
the locking end of the second locking pin being engaged with the trailer hitch through the right pin hole.

12. The trailer hitch receiver locking apparatus as claimed in claim 10 comprises:
wherein the automatically engaging safety mechanism is positioned in a disengaged configuration;
the pin-connecting end of the first linkage rod being disengaged from the locking hole and adjacently positioned behind the locking tab;
the locking tab being angularly positioned with the first pin housing;
the locking end of the first locking pin being disengaged from a trailer hitch through the left pin hole; and
the locking end of the second locking pin being disengaged from the trailer hitch through the right pin hole.

13. A trailer hitch receiver locking apparatus comprises:
a main frame;
a first pin assembly;
a second pin assembly;
a locking mechanism;
an automatically engaging safety mechanism;
the main frame comprises a pin guide, a first pin housing, a second pin housing, a first proximal cavity, a first distal cavity, a second proximal cavity, and a second distal cavity;
the pin guide comprises a base, a first wall, and a second wall;
the first pin housing and the second pin housing each comprise a proximal end and a distal end;
the first pin assembly comprises a first locking pin, a first compression spring, a first stop pin, and a first cavity;
the second pin assembly comprises a second locking pin, a second compression spring, a second stop pin, and a second cavity;
the first locking pin and the second locking pin each comprise a locking end and a connecting end;
the locking mechanism comprises a pivot plate, a locking handle, a first linkage rod, and a second linkage rod;
the automatically engaging safety mechanism comprises a spring loaded hinge, extension lever, a safety handle, a locking tab, and a locking hole;
the first wall and the second wall being perpendicularly connected with the base;
the first wall and the second wall being oppositely positioned from each other across the base;
the proximal end of the first pin housing being adjacently connected to the first wall;
the proximal end of the first pin housing being oppositely positioned from the second wall;
the distal end of the first pin housing being oppositely positioned from the proximal end of the first pin housing;
the proximal end of the second pin housing being adjacently connected to the second wall;
the proximal end of the second pin housing being oppositely positioned from the first wall;
the distal end of the second pin housing being oppositely positioned from the proximal end of the second pin housing;
a locking plate being adjacently connected with the distal end of the second pin housing;
the locking plate being positioned parallel with the distal end of the second pin housing;
the first pin assembly being engaged with the first pin housing and the pin guide;
the second pin assembly being engaged with the second pin housing and the pin guide; and
the locking mechanism being pivotally connected with the first pin housing and engaged within, between the first pin assembly and the second pin assembly.

14. The trailer hitch receiver locking apparatus as claimed in claim 13 comprises:
the first distal cavity traversing through the distal end of the first pin housing;
the first proximal cavity traversing through the proximal end of the first pin housing and the first wall;
the second distal cavity traversing through the distal end of the second pin housing;
the second proximal cavity traversing through the proximal end of the second pin housing and the second wall;
the first distal cavity, the first proximal cavity, the second distal cavity, the second proximal cavity being concentrically positioned with each other;
the spring loaded hinge being connected with the first pin housing adjacent to the proximal end;
the extension lever being perpendicularly connected with the spring loaded hinge;
the safety handle being connected with the extension lever;
the extension lever being positioned in between the safety handle and the spring loaded hinge;
the locking tab being connected along the extension lever adjacent to the safety handle; and
the locking hole traversing through the locking tab.

15. The trailer hitch receiver locking apparatus as claimed in claim 13 comprises:
the locking end of the first locking pin being oppositely positioned from the connecting end of the first locking pin;
the first stop pin traversing through the first locking pin;
the first stop pin being adjacently positioned with the locking end of the first locking pin;
the first cavity being traversing through the first locking pin;
the first cavity being adjacently positioned with the connecting end of the first locking pin;
the first compression spring being concentrically positioned around the first locking pin;
the first compression spring being positioned in between the first cavity and the first locking pin;
the connecting end of the first locking pin being concentrically positioned within the first distal cavity;
the locking end of the first locking pin being concentrically positioned within the first proximal cavity;
the first stop pin being adjacently positioned with the proximal end of the first pin housing;
the first compression spring being positioned in between the distal end of the first pin housing and the first stop pin; and
the first cavity being adjacently and externally positioned with the distal end of the first pin housing.

16. The trailer hitch receiver locking apparatus as claimed in claim 13 comprises:
the locking end of the second locking pin being oppositely positioned from the connecting end of the second locking pin;
the second stop pin traversing through the second locking pin;
the second stop pin being adjacently positioned with the locking end of the second locking pin;
the second cavity being traversing through the second locking pin;
the second cavity being adjacently positioned with the connecting end of the second locking pin;
the second compression spring being concentrically positioned around the second locking pin;
the second compression spring being positioned in between the second cavity and the second locking pin;
the connecting end of the second locking pin being concentrically positioned within the second distal cavity;
the locking end of the second locking pin being concentrically positioned within the second proximal cavity;
the second stop pin being adjacently positioned with the proximal end of the second pin housing;
the second compression spring being positioned in between the distal end of the second pin housing and the second stop pin; and
the second cavity being adjacently and externally positioned with the distal end of the second pin housing.

17. The trailer hitch receiver locking apparatus as claimed in claim 13 comprises:
the pivot plate comprises a first plate hole, a second plate hole, and a third plate hole;
the first linkage rod and the second linkage rod each comprise a plate-connecting end and a pin-connecting end;
the first plate hole, the second plate hole, and the third plate hole traversing through the pivot plate;
the third plate hole being linearly positioned in between the first plate hole and the second plate hole;
the pivot plate being pivotally connected with the first pin housing through the third plate hole;
the locking handle being connected with the pivot plate adjacent to the second plate hole;
the plate-connecting end being oppositely positioned from the pin-connecting end along the first linkage rod and the second linkage rod;
the plate-connecting end of the first linkage rod being slidably engaged with the first plate hole;
the pin-connecting end of the first linkage rod being slidably engaged with the first cavity;
the plate-connecting end of the second linkage rod being slidably engaged with the second plate hole;
the pin-connecting end of the second linkage rod being slidably engaged with the second cavity; and
a retainer plate being adjacently connected with the pin-connecting end of the second linkage rod.

18. The trailer hitch receiver locking apparatus as claimed in claim 17 comprises:
the pin guide being connected to a hitch receiver;
the first locking pin being concentrically positioned with a left pin hole of the hitch receiver; and
the second locking pin being concentrically positioned with a right pin hole of the hitch receiver.

19. The trailer hitch receiver locking apparatus as claimed in claim 18 comprises:
the automatically engaging safety mechanism being positioned in an engaged configuration;
the pin-connecting end of the first linkage rod being concentrically engaged with the locking hole;
the locking tab being positioned parallel with the first pin housing;
the locking end of the first locking pin being engaged with a hitch device through the left pin hole; and
the locking end of the second locking pin being engaged with the trailer hitch through the right pin hole.

20. The trailer hitch receiver locking apparatus as claimed in claim 18 comprises:
the automatically engaging safety mechanism being positioned in a disengaged configuration;
the pin-connecting end of the first linkage rod being disengaged from the locking hole and adjacently positioned behind the locking tab;
the locking tab being angularly positioned with the first pin housing;

the locking end of the first locking pin being disengaged from a trailer hitch through the left pin hole; and the locking end of the second locking pin being disengaged from the trailer hitch through the right pin hole.

* * * * *